July 18, 1950     A. KORFF     2,516,090

GEAR HOUSING

Filed March 1, 1945

Inventor:
Abram Korff
By Kent W. Worrell
Attorney

Patented July 18, 1950

2,516,090

UNITED STATES PATENT OFFICE 2,516,090

GEAR HOUSING

Abram Korff, Chicago, Ill., assignor to Merkle-Korff Gear Company, Chicago, Ill., a corporation of Illinois Application March 1, 1945, Serial No. 580,306

2 Claims. (Cl. 74—606)

This invention relates in general to a gear reduction drive, and is more particularly described as a differential gear driving unit for reducing the speed of an electric motor, or any other driving mechanism in which they are adapted to be used.

An important object of this invention is to provide a close coupled driving unit of much reduction of speed in which the high speed of a low power motor can be utilized to produce a relatively high driving torque at relatively low speed.

A further object of the invention is to provide a reduction drive in which gearing is mounted on a shaft in a closed casing having a removable cover which also provides a bearing for one end of the main driving shaft.

A further object of the invention is to provide the gear casing with projections at the bottom upon which it may be supported for operation in an upright position, and also with lateral perforated extensions of the casing by means of which the driving unit may be bolted or otherwise fastened to an upright support.

Still another object of the invention is to provide a cover having a lower supporting edge with oil fill and outlet openings and a shaft bearing opening closed by a tight pressure plate.

Figure 2:
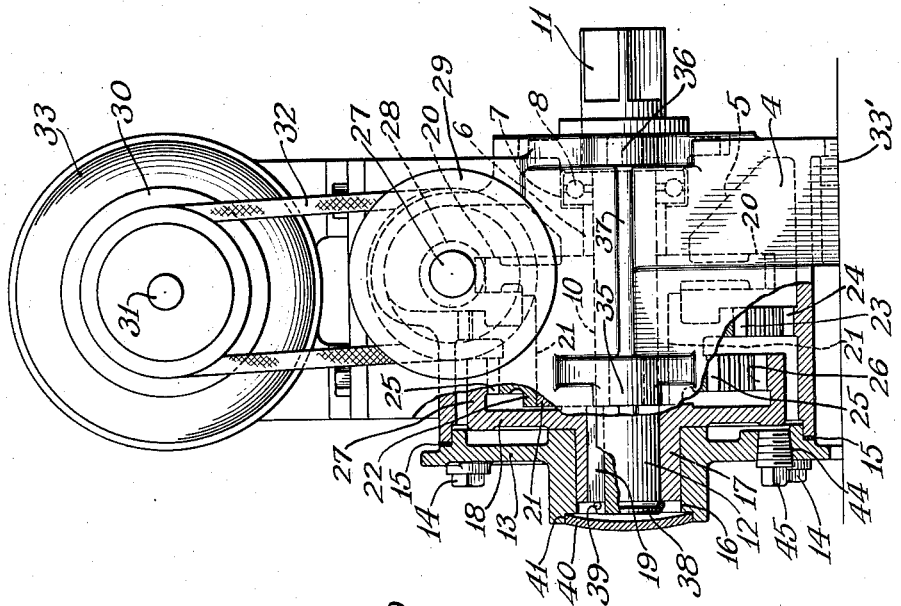
Figure 1:
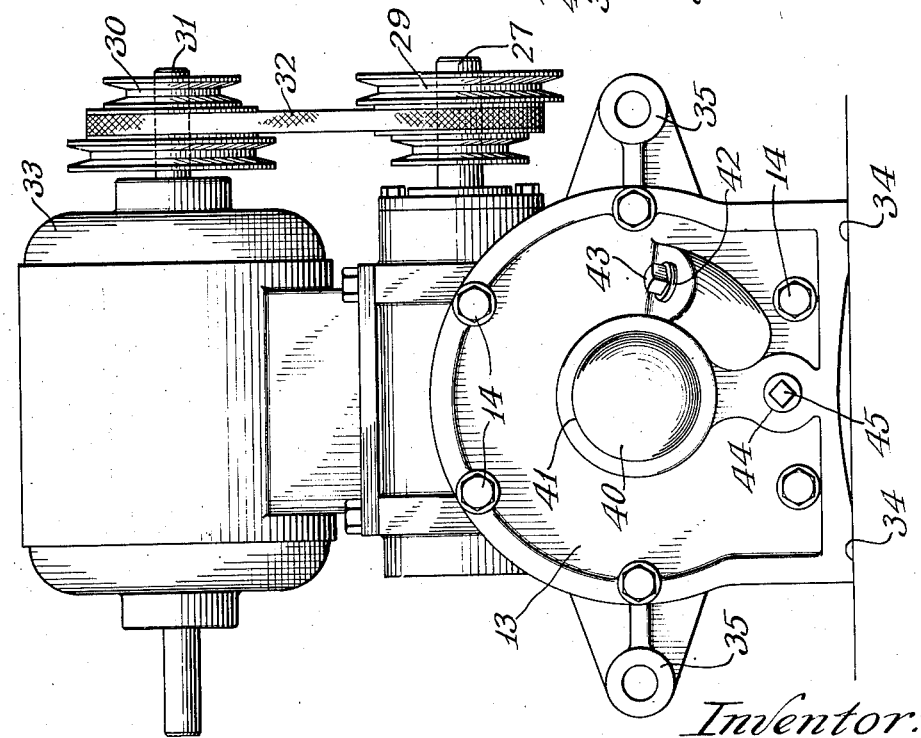

Other objects of the invention will appear in the specification and will be apparent from the accompanying drawings in which Fig. 1 is an elevation showing the front removable and mounting plate of a reduction drive unit in accordance with the invention; and Fig. 2 is a side elevation with parts broken away to show the gearing and its mounting in the cover plate in section.

In providing a slow speed drive mechanism operated by a high speed motor, there is usually a sufficient safety driving factor by providing a belt drive between the motor and the gearing itself. In the present invention, a high speed reduction is obtained first by drive pulleys, then by a worm gear, and then by a reduction gearing of the planetary type which terminates in a driving shaft mounted at one end in a fixed bearing of the casing, and mounted at the other end in a removable bearing formed by the cover of the casing.

Referring now more particularly to the drawings, a gear casing 4 has a rear wall 5 in which is a shaft bearing 6, a recess 7 for receiving a shaft bearing 8, and a packing gland 9 through which a shaft 10 extends having an outer projecting driving end 11 and an opposite bearing end 12.

The other side of the casing is open and an inwardly flanged cover 13 is applied tightly to the opening by bolts 14 with a gasket or packing 15 to make a fluid tight joint with the casing. At the center of the casing is a bearing opening 16 for receiving the inner end 12 of the shaft and also for forming a bearing mounting for a projecting hub 17 of a gear 18 extending around and secured to this end of the shaft by a key 19.

Between the gear 18 and freely mounted on the shaft is a change speed driving gearing, comprising a worm driven gear 20 having an eccentric hub portion 21 upon which is mounted a double gear member 22 having an eccentric gear 23 adapted to mesh with a gear 24 at the inside of the casing, and a corresponding eccentric gear 25 adapted to mesh with an inside gearing 26 mounted upon an extension 27 of the gear member 18 which is secured to the shaft 10. The particular sizes, construction and operation of this reduction gearing may be varied, it being sufficient for the purpose of this application that any change speed driving gearing may be incorporated within the casing.

A driving shaft 27 is mounted at the top of the casing and projecting therefrom having a worm pinion 28 mounted on the shaft in the casing and meshing with worm gear 20. Outside of the casing, a multiple drive pulley 29 is mounted on the end of the shaft in aligned relation to a corresponding multiple drive pulley 30 mounted upon a motor shaft 31, the pulleys being connected for different driving engagements by a belt 32.

Secured to the top of the casing is a driving motor 33 which has the driving shaft 31 projecting therefrom so that the operation of the motor produces a corresponding movement of the driving shaft 11 through the variable belt drive and through the change speed gearing within the casing so that a reduction in speed or a reduction in power may be obtained, depending upon the connections of the belts and the gearing.

At the bottom of the motor casing and projecting oppositely at both sides are supporting feet 33' and at the lower edge of the cover 13 are angular corners 34 by which the unit may be supported in upright position upon a plane surface. Projecting from opposite sides of the casing are front and rear perforated ears 35 and 36 joined by a strengthening rib 37 terminating with the ear perforations so that a fastening bolt may be inserted through the ears at each side for fastening the unit to an upright support.

Thus the unit is adapted for vertical or horizontal mounting and the front fastening ears 35 extend outwardly from the casing 4 entirely free from the cover 13 so that it is accessible for removal to facilitate the adjustment, replacement and removal of any of the gear elements within the casing without affecting the vertical mounting of the unit.

To connect the gear 18 and shaft 10 at the keyed end, the shaft may be formed with a groove 38 for receiving a spring ring 39 which bears against the hub 17 of the gear 18 holding the gear and shaft in place against axial movement. The bearing opening 16 extends through the cover as it is thus more easily and accurately formed and machined.

A frictional disc 40 is applied at the outer end of the bearing opening 16 by providing a shouldered recess 41 into which the disc is inserted under pressure or by threading it in place. The cover is also provided with a projection having an oil fill opening 42 closed by a plug 43 and with a discharge opening 44 closed by a plug 45.

Various changes may be made in the construction, combination and arrangement of the parts without departing from the spirit and scope of the invention.

I claim:

1. In a driving unit, a casing closed at one side and open at the other, a shaft having a bearing in and extending through the closed side of the casing, gears mounted upon the shaft within the casing and one of them having a hub extending adjacent the other end of the shaft, means for connecting the gears, means for driving the gears, a cover for the open side of the casing having a bearing opening for seating the end of the shaft and the hub end of the gear therein, a groove around the end of the shaft beyond the hub, a spring ring seated in the groove to limit the movement of the shaft inwardly in the hub, and a cover disc in the end of the bearing opening closing the cover.

2. In a reduction gear driving unit, a casing open at one side and closed at the other, a driving gear adjacent the open side having a hub projecting outwardly from the casing, a shaft in the casing keyed in the hub and projecting beyond the outer end of the hub, a spring ring seated at the end of the shaft and bearing against the end of the hub to hold the shaft and hub against relative endwise movement, a removable cover for the open end of the casing having a hollow hub into which the hub of the gear is seated for a bearing, and a removable disc at the outer end of the cover hub extending over the adjacent ends of the shaft and the gear hub.

ABRAM KORFF.

REFERENCES CITED

The following references are of record in the file of this patent:

UNITED STATES PATENTS

| Number | Name | Date |
| --- | --- | --- |
| 1,083,329 | Lancia | Jan. 6, 1914 |
| 1,438,289 | Barbarou | Dec. 12, 1922 |
| 1,460,768 | Royce | July 3, 1923 |
| 1,504,706 | Pachter | Aug. 12, 1924 |
| 1,599,729 | Taylor | Sept. 14, 1926 |
| 1,651,959 | Meyers | Dec. 6, 1927 |
| 1,801,006 | Jacoby | Apr. 14, 1931 |
| 1,911,666 | Beitz | May 30, 1933 |
| 2,001,562 | Bagley, Jr. | May 14, 1935 |
| 2,038,731 | Gunderson | Apr. 28, 1936 |
| 2,266,744 | Dunkelberger | Dec. 23, 1941 |
| 2,308,458 | Saurer | Jan. 12, 1943 |
| 2,368,731 | Snyder | Feb. 6, 1945 |